United States Patent [19]

Morlan

[11] 4,082,957
[45] Apr. 4, 1978

[54] X-RAY ABSORBING WEDGE FOR IMPROVING SOFT TISSUE OUTLINE

[76] Inventor: Alva F. Morlan, 8044 Pawnee, Prairie Village, Kans. 66208

[21] Appl. No.: 681,556

[22] Filed: Apr. 29, 1976

[51] Int. Cl.² .......................................... G03B 11/00
[52] U.S. Cl. .................... 250/482; 250/475; 250/510
[58] Field of Search ............... 250/475, 478, 482, 481, 250/510

[56] References Cited

U.S. PATENT DOCUMENTS

| | | | |
|---|---|---|---|
| 2,387,887 | 10/1945 | Dimsdale et al. | 250/482 |
| 2,405,444 | 8/1946 | Moreau et al. | 250/510 |
| 2,426,884 | 9/1947 | Kieffer | 250/510 |
| 2,441,945 | 5/1948 | Frolich et al. | 74/231 S |
| 2,496,218 | 1/1950 | Kieffer | 250/482 |
| 3,819,937 | 6/1974 | Sovijarvi et al. | 250/510 |

*Primary Examiner*—Bruce C. Anderson
*Attorney, Agent, or Firm*—D. A. N. Chase

[57] ABSTRACT

An X-ray cassette used in dental and medical X-ray equipment is provided with a thin, plate-like filter member of X-ray absorbing material which is sandwiched between the front plate of the cassette and the front intensifying screen. The member extends partially across the cassette to filter radiation incident on a portion of the film, and terminates in a featheredge beyond which the radiation is unfiltered. The member is tapered toward the featheredge to present a wedge-shaped cross-sectional configuration, thereby providing progressively increased soft tissue resolution away from the featheredge without producing a visible line of demarcation between the filtered and unfiltered areas of the resulting radiograph.

15 Claims, 9 Drawing Figures

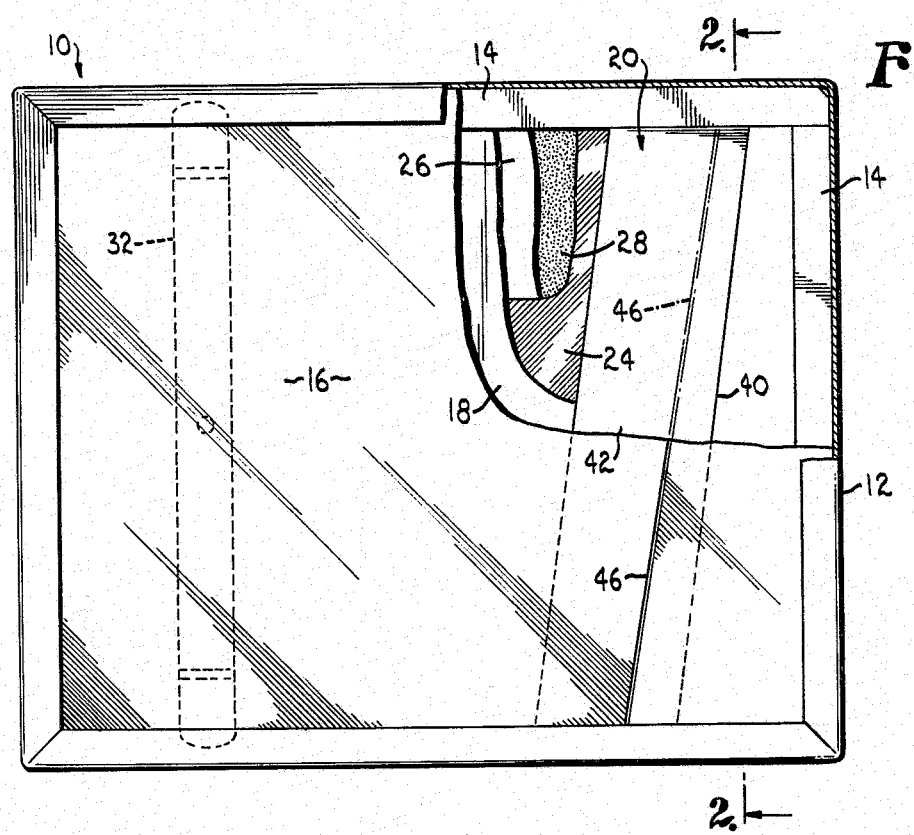
Fig.1.
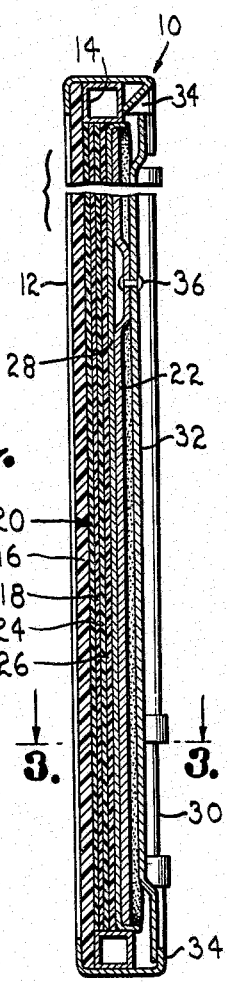
Fig.2.
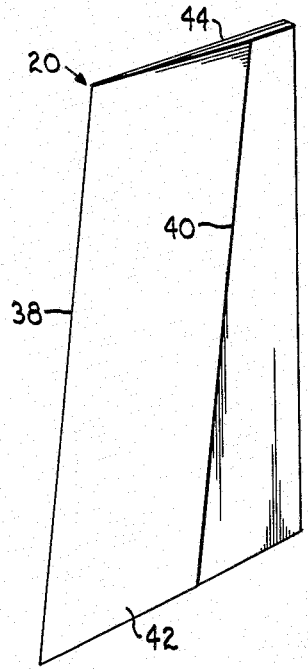
Fig.4.
Fig.5.
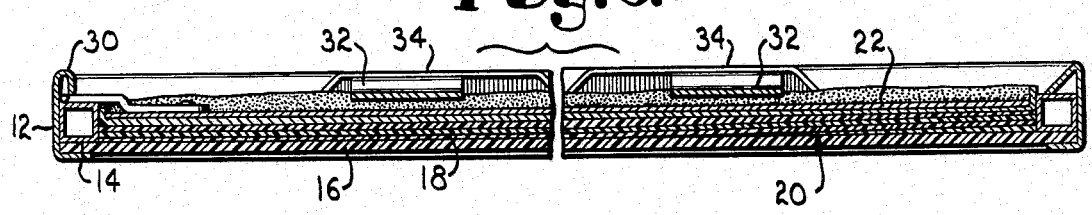
Fig.3.

4,082,957

X-RAY ABSORBING WEDGE FOR IMPROVING SOFT TISSUE OUTLINE

This invention relates to apparatus for obtaining dental and medical radiographs exhibiting markedly increased soft tissue resolution in selected areas of the subject and, in particular, to a cassette which is provided with a special filter that automatically produces this result without the need for external shields or absorbers.

In recent years special techniques have been developed for rendering soft tissue distinguishable in X-ray photography, particularly in the field of orthodontics wherein good definition of the normal facial outline (soft tissue) is required in order to ensure that dental corrections do not adversely affect or change the external facial appearance of the patient. However, these techniques involve the time-consuming and laborious tracing of standard radiographs, the major problem being the ability to obtain good tracings of the soft tissue outline from the exposed film. Oftentimes it is necessary to take two X-ray photographs of the patient, one to obtain good bone and tooth definition and the second to obtain soft tissue definition.

Additionally, several methods involving the placement of sheets of metal or other absorptive materials between the X-ray source and the patient or between the patient and the cassette have been investigated, but with a minimum amount of success. These methods are cumbersome and, in some cases, disturbing to the patient. Accordingly, they have not been widley accepted.

It is, therefore, the primary object of the present invention to provide a simple and straightforward means of obtaining the desired definition of both hard and soft tissues in a single exposure of the patient to X-ray radiation.

As a corollary to the foregoing object, it is an important aim of this invention to provide a filter device for improving the resolution of soft tissue in a selected area of a radiograph, but without producing a visible line of demarcation between the filtered and unfiltered areas of the radiograph.

A further and important object of the invention is to provide an X-ray cassette specially equipped to provide a radiograph in a single exposure that will yield both good bone and/or tooth resolution and resolution of soft tissues, without the need for external shields or absorbers or other external apparatus.

Another important object of the invention is to provide a cassette as aforesaid having a built-in filter which does not have to be handled or positioned by the operator in the use of the X-ray equipment.

Still another important object of the invention is to provide a cassette as aforesaid wherein such filter is relatively thin in order to permit its incorporation into standard X-ray cassettes with only minor modification.

Additionally, it is an important object of this invention to provide such a filter in the form of a plate-like absorptive member extending partially across the cassette to a featheredge and which is tapered toward said featheredge in order to provide progressively increased soft tissue resolution away from the featheredge in the affected area of the radiograph without producing a visible line of demarcation between the filtered and unfiltered areas.

Yet another important object is to provide an X-ray absorbing material for the aforesaid filter that renders the latter capable of producing the desired soft tissue resolution with a minimum of filter thickness, thereby facilitating the addition of the filter to cassettes of standard construction. In the drawings:

FIG. 1 is a front elevational view of the X-ray cassette of the present invention with parts broken away to better illustrate the filter member and the successive layers of the cassette construction, one of the rear door locking arms being shown in the locked position in broken lines;

FIG. 2 is a fragmentary, side sectional view of the cassette taken along line 2—2 of FIG. 1, and on an enlarged scale;

FIG. 3 is a fragmentary, longitudinal sectional view taken along line 3—3 of FIG. 2;

FIG. 4 is a perspective view of the filter member itself, particularly showing the taper and the featheredge;

FIG. 5 is a top plan view of the filter member of FIG. 4 on an enlarged scale;

Figure 6:
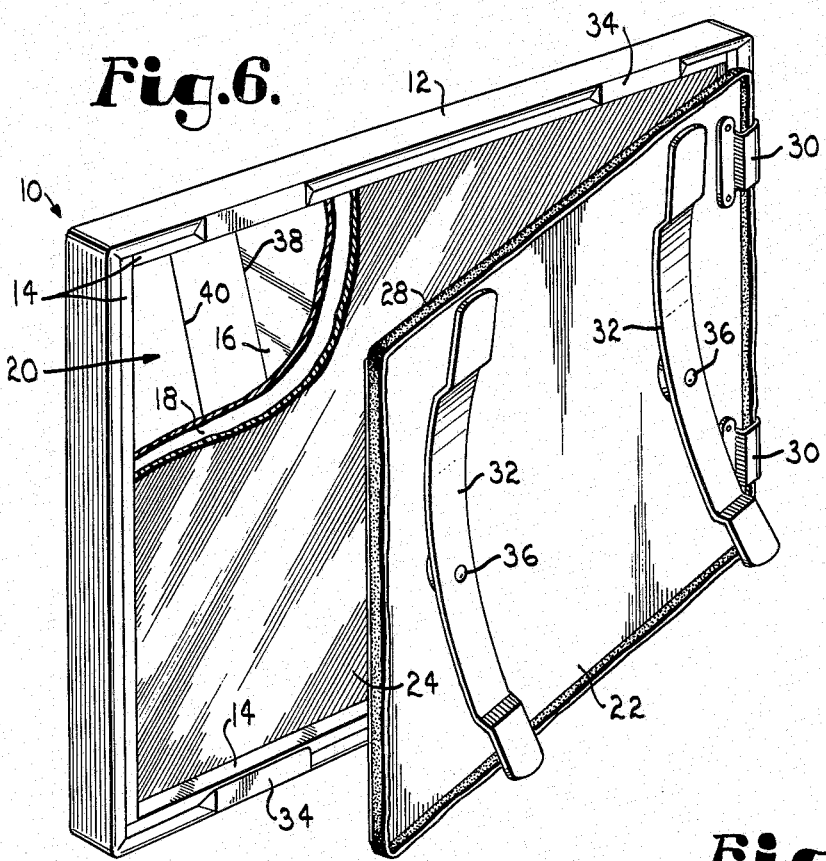
FIG. 6 is a rear perspective view of the cassette with the access door in a partially open position, one corner of the front intensifying screen and the X-ray film being broken away to show the location of the filter member.
Figure 7:
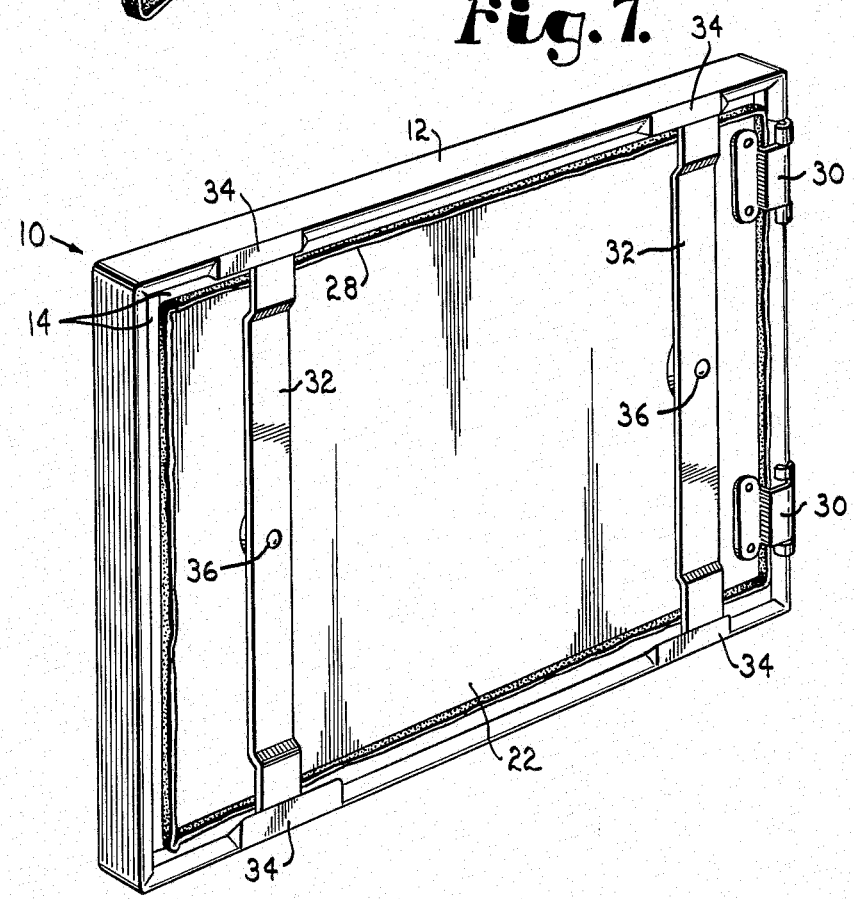
FIG. 7 is a rear perspective view of the cassette similar to FIG. 6, but shows the door locked in the closed position.

Referring to FIGS. 1–7, a cassette 10 typical of the type used in dental and medical X-ray equipment has an outer, rectangular frame 12 circumscribing a tubular, inner frame 14 of square cross-section. The outer frame 12 is of sheet metal construction and has a peripheral lip at the front which is bent inwardly at a right angle as is clear in FIGS. 2 and 3. A light-opaque front plate 16 has its peripheral edge clamped between the front lip of the frame 12 and the inner frame 14, and may be composed of Bakelite or a similar material. In a standard cassette which is not modified in accordance with the present invention, a front intensifying screen 18 is adhered directly to the rear surface of the front plate 16.

However, in the present invention a thin, platelike filter member 20 is sandwiched between a portion of the front plate 16 and an opposing portion of the intensifying screen 18. Since the maximum thickness of the member 20 is typically 0.05 inch (1.3 mm.), the insertion of the member 20 between the plate 16 and screen 18 does not interfere with the film compartment in the cassette best seen in FIG. 6 where the rear access door 22 is shown partially open. The film 24 is shown loaded in the compartment and is sandwiched between the front intensifying screen 18 and a rear intensifying screen 26 when the door 22 is closed and locked.

The rear intensifying screen 26 is carried by the door 22, the latter being provided with a felt facing 28 on its front surface. The facing 28 extends outwardly somewhat beyond the edges of the door 22 so as to provide a light-tight seal when the door 22 is closed. The rear intensifying screen 26 is adhered directly to the front surface of the facing 28.

The door 22 is mounted on the outer frame 12 by a pair of hinges 30 and is secured in its closed position by a pair of resilient locking arms 32. Two pairs of aligned lips 34 are integrally formed in the rear edge of the frame 12, each such pair 34 receiving the ends of a corresponding locking arm 32 when the same is moved to the locked position illustrated in FIGS. 2, 3 and 7. Each arm 32 is mounted on the back side of the door 22 by a pivot pin 36 which is centered with respect to the ends of the arm. As may be appreciated by comparing FIGS. 6 and 7, the arms 32 are flexed inwardly and rotated to engage the tips of the arms within the respective lips 34.

Referring particularly to FIGS. 1, 4 and 5, it may be seen that the filter member 20 is of rectangular configuration except for one longitudinal edge which presents a featheredge 38 that is disposed at an angle of tilt with respect to the vertical. The member 20 is tapered toward the featheredge 38 from a line 40 parallel to the featheredge 38. The taper is uniform on one face of the member 20; thus the tapered part 42 between the line 40 and the featheredge 38 is of wedge-shaped cross-sectional configuration. The remaining portion of the member 20 is of uniform thickness and is narrower in width at the top than at the bottom.

The filter member 20 is composed of a material that is capable of absorbing X-ray radiation to a high degree when formed into a thin layer. Possible materials include suitably dimensioned solid metal sheets and plastics filled with fine metallic particles or selected oxides or salts of the heavy elements. It is required that the selected material be fabricated into a thin plate or sheet having a very thin, lightly absorbing edge (the featheredge 38) and a uniformly increasing thickness away from such edge until heavy absorption of X-ray radiation occurs. With respect to solid metals, a problem encountered with ferrous alloys in sheet form is the difficulty in machining such sheets to a wedge-shaped cross-section presenting a featheredge of approximately 40 mils (1 mm.) thickness. It is necessary that this one edge be very thin (and, consequently, very low in absorptive capability) in order to prevent the development of a visible line of demarcation on the radiograph dividing the filtered and unfiltered areas.

Accordingly, it is preferred in the present invention that the material be composed of an admixture of a suitable thermoplastic or thermosetting resin and finely divided particles of a highly absorptive substance such as powdered heavy metals or powdered oxides or salts of these heavy metals. Examples include powdered lead or lead alloys, powdered iron or any of its alloys, and powdered oxides or salts of the heavy elements exemplified by lead oxide (PbO), finely ground lead sulfate ($PbSO_4$) and lead sulfide (PbS). In general, it is desired to have the highest absorptive power per unit volume of the powdered material in order to keep the thickness of the filter member to a minimum and to select an admixture that is amenable to either injection or compression molding techniques. The geometeric configuration of the filter member will be determined by the particular application in dental or medical X-ray photography, the cephalometric radiograph of FIG. 8 used in the field of orthodontics being illustrated herein as an example of the application of the teachings of the present invention.

A specific preferred formulation is an admixture of powdered lead oxide dispersed in a thermosetting epoxide resin composition, the relative proportions being as follows:

1. Shell Chemical Co. Epon 828—17.5 parts by weight
2. General Mills Epoxy Co.-reactant 260—7.5 parts by weight
3. Lead oxide (−325 mesh)—25 to 100 parts by weight The resin reactants and the lead oxide are thoroughly mixed using a high speed (5000 rpm), high shear mixer to thoroughly disperse the oxide in the liquid resin. The admixture is then de-aired by subjecting the same to a partial vacuum until all entrapped air is removed. This produces a molding composition that may be poured into a suitable mold, such as a silicon rubber mold of the desired geometric configuration. Before curing, an expoxide resin impregnated paper laminate 0.01 inch (0.254 mm.) thick is placed over the top of the mold. Curing is effected in a forced air circulation oven at 140°F. (60°C.) for a period of 1 hour. After cooling, the solidified part is removed and the flash trimmed off. To form the featheredge, the finished filter member is milled at an angle of 3°with respect to the opposite, flat side to which the paper laminate is adhered. Such laminate is seen at 44 in FIGS. 4 and 5.

The foregoing fabrication procedure provides a leading edge (featheredge 38) having a thickness of between 1 and 2 mils (0.025 mm. and 0.05 mm.). Using lead oxide in an amount equal to 75 parts by weight in the above formulation, the thickness of member 20 from line 40 to the trailing edge should be from 40 to 50 mils (1 mm. to 1.25 mm.). This maximum thickness and degree of taper in the wedge-shaped part 42 provides the desired absorptive properties.

The required thickness will, of course, vary depending upon the relative amounts of lead oxide and resin selected. Although a greater proportion of lead oxide increases absorption for a given thickness, it has been found that over 100 parts by weight in the above formulation produces an admixture that is too viscous to be readily workable.

Referring to FIG. 1, the only other modification of the cassette 10 is the inscribing of a visible line 46 on the face of the front plate 16 as a guide to the operator in aligning the patient with the cassette. It should be noted that the line 46 marks the locaton of the wedge-shaped part 42 within the cassette in that the line 46 coincides with the thicker portion of the part 42 adjacent the line 40 at the thick end of the taper. Accordingly, the visible line 46 is used by the X-ray machine operator to properly position the patient for a cephalometric radiograph of the type illustrated in FIG. 8 where it is desired to obtain increased soft tissue resolution in the area of the patient's facial features so that the soft tissue outline will be clearly distinguishable. The angle of tilt of the wedge-shaped part 42 with respect to the vertical accommodates the natural contour of the human face and prevents excessive absorption at the forehead and eye areas. This is particularly important to an orthodontist who will want to see the precise location of the bone structure at these areas in order to check continuity of facial features during the corrective procedure. Lower on the face, however, heavier absorption is desirable so that the lips and the area surrounding the mouth will be clearly visible on the radiograph. As may be seen in FIG. 8, the facial features are clearly visible including the outline of the nose, mouth and chin. Without the filter of the present invention, only the bone structure and teeth would be clearly distinguishable.

Figure 8:
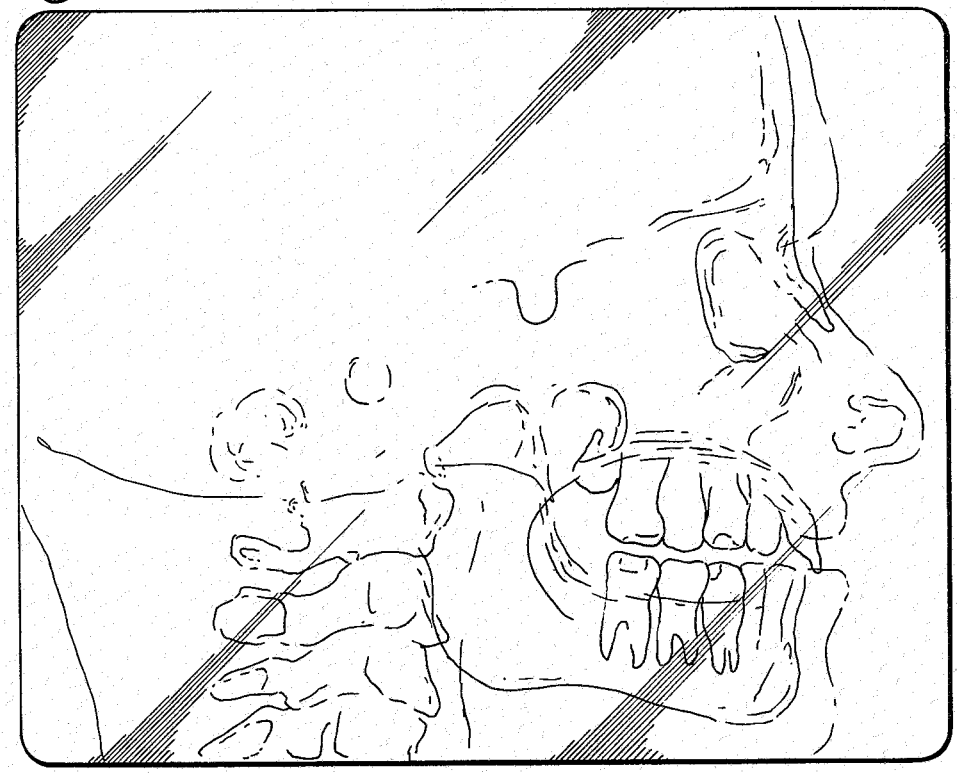
FIG. 8 is a view of a cephalometric radiograph illustrating the effect of the filter member in improving the soft tissue outline at the front of the head.
Figure 9:
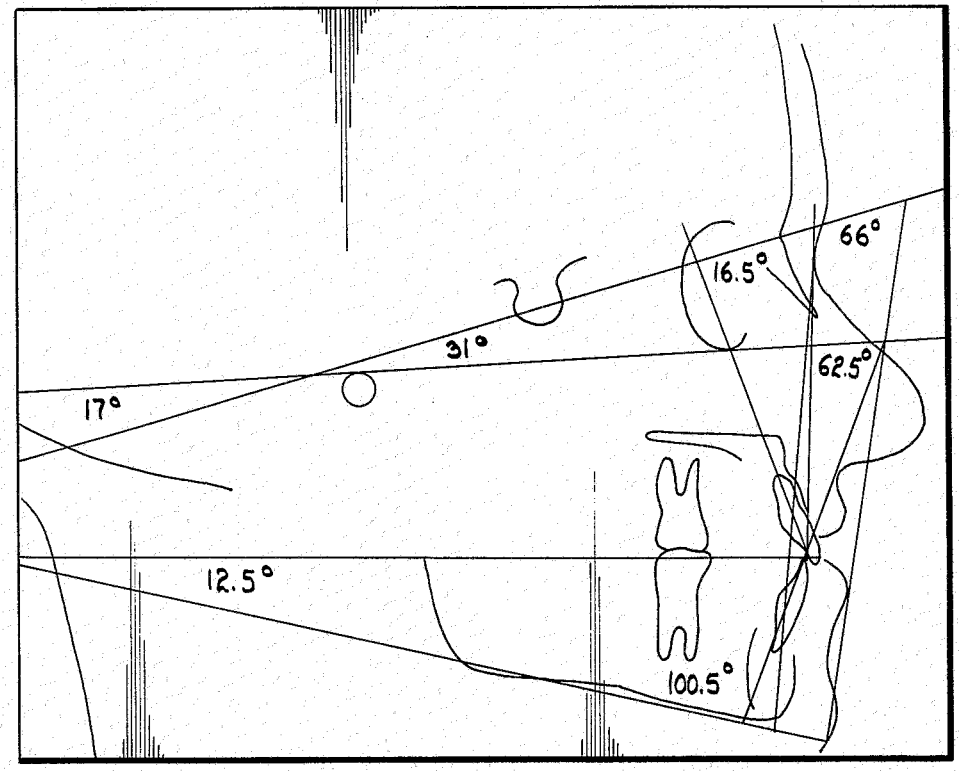
FIG. 9 is an example of an overlay made directly from the radiograph illustrated in FIG. 8 and which is used by an orthodontist in the corrective procedure.

FIG. 9 illustrates the ease with which an overlay may be prepared from the radiograph of FIG. 8. The various angles noted thereon are exemplary of the notations and calculations made by an orthodontist as a part of the corrective procedure. Through the use of the present invention, critical features of both hard and soft tissues may be immediately located without guesswork from a single radiograph of the subject.

Having thus described the invention, what is claimed as new and desired to be secured by Letters Patent is:

1. An X-ray cassette for use in dental and medical X-ray equipment, said cassette comprising:
    a film-receiving compartment,
    a thin, plate-like member of X-ray absoring material, and
    means mounting said member in ray-filtering relationship to X-ray radiation incident on a portion of a film in said compartment,
    said member extending partially across the cassette to a featheredge of the member beyond which the radiation will be unfiltered, said featheredge being sufficiently thin to prevent a visible line of demarcation from appearing between the filtered and unfiltered areas of a resulting radiograph, and said member being tapered toward said featheredge to present absorptive material of progressively increased thickness away from said featheredge to thereby provide progressively increased soft tissue resolution away from said featheredge in said portion of a film 2. The cassette as claimed in claim 1, wherein said member extends from a margin of the cassette to said featheredge.

3. The cassette as claimed in claim 1, wherein at least a part of said member is wedge-shaped in cross section and presents said featheredge.

4. The cassette as claimed in claim 1, wherein said material is an admixture of a particulate, highly absorptive substance dispersed in a solidified resin.

5. The cassette as claimed in claim 4, wherein said substance is lead oxide.

6. The cassette as claimed in claim 4, wherein said resin is present in said admixture in an amount equal to approximately 25 parts by weight, and said substance is lead oxide present in an amount in the range of from 25 to 100 parts by weight.

7. In an X-ray cassette used in dental and medical X-ray equipment, said cassette having a front, light-opaque plate, a rear access door, and a film-receiving compartment between said plate and said door, the improvement comprising a thin, plate-like member of X-ray absorbing material disposed between said front plate and said compartment, said member being in ray-filtering relationship to X-ray radiation incident on a portion of a film in said compartment and entending partially across the cassette to a featheredge of the member beyond which the radiation will be unfiltered, said featheredge being sufficiently thin to prevent a visible line of demarcation from appearing between the filtered and unfiltered areas of a resulting radiograph, said member being tapered toward said featheredge to present absorptive material of progressively increased thickness away from said featheredge to thereby provide progressively increased soft tissue resolution away from said featheredge in said portion of a film 8. The improvement as claimed in claim 7, wherein said member extends from a margin of the cassette to said featheredge.

9. The improvement as claimed in claim 7, wherein at least a part of said member is wedge-shaped in cross section and presents said featheredge.

10. The improvement as claimed in claim 7, wherein said material is an admixture of a particulate, highly absorptive substance dispersed in a solidified resin.

11. The improvement as claimed in claim 10, wherein said substance is lead oxide.

12. The improvement as claimed in claim 10, wherein said resin is present in said admixture in an amount equal to approximately 25 parts by weight, and said substance is lead oxide present in an amount in the range of from 25 to 100 parts by weight.

13. The improvement as claimed in claim 7, wherein said cassette further has opposed, front and rear intensifying screens defining said compartment, said member being sandwiched between said front plate and said front intensifying screen.

14. The improvement as claimed in claim 7, wherein said member extends from a margin of the cassette to said featheredge, a part of said member spaced from said margin being wedge-shaped in cross section and presenting said featheredge.

15. The improvement as claimed in claim 14, wherein said front plate is provided with a visible line on its outer face marking the location of said wedge-shaped part within the cassette, whereby to aid in alignment of the patient with the cassette.

* * * * *